Jan. 10, 1967 O. C. LUNDSTROM 3,297,908

TUNING APPARATUS FOR KLYSTRONS

Filed Aug. 6, 1964

2 Sheets-Sheet 1

INVENTOR.
OSCAR C. LUNDSTROM

BY Harry E. Aine

ATTORNEY

Jan. 10, 1967 O. C. LUNDSTROM 3,297,908

TUNING APPARATUS FOR KLYSTRONS

Filed Aug. 6, 1964 2 Sheets-Sheet 2

INVENTOR.
OSCAR C. LUNDSTROM

BY Harry E. Aine

ATTORNEY

United States Patent Office 3,297,908

Patented Jan. 10, 1967

3,297,908

TUNING APPARATUS FOR KLYSTRONS

Oscar C. Lundstrom, Sunnyvale, Calif., assignor to Varian Associates, Palo Alto, Calif., a corporation of California Filed Aug. 6, 1964, Ser. No. 387,740
10 Claims. (Cl. 315—5.47)

Figure 1:
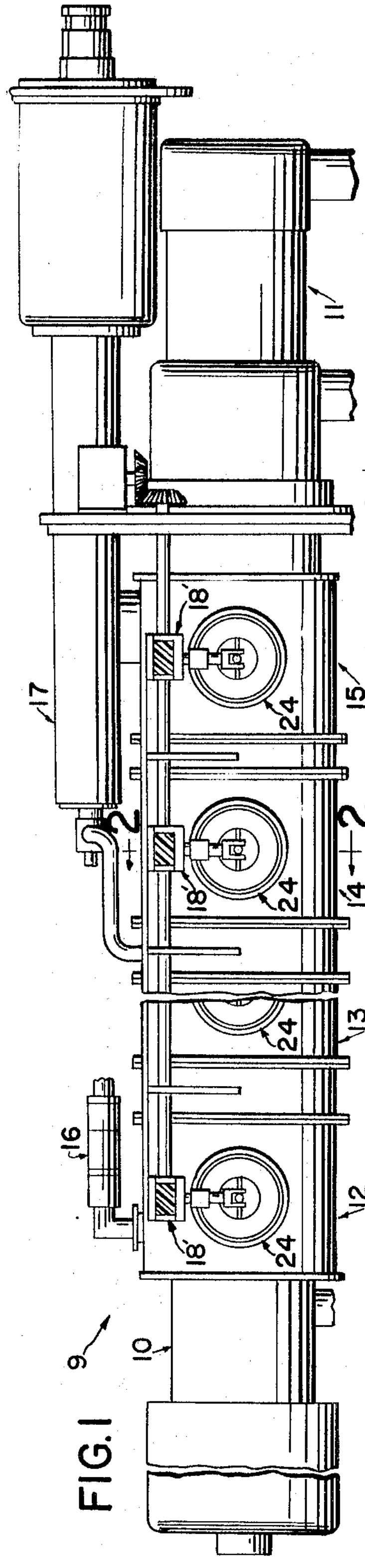

This invention relates in general to high frequency electron discharge devices, such as for example, klystrons and more particularly to resonant cavity constructions and tuning apparatus for such devices.

The prior art has taught various means for providing tunable resonant cavities for klystrons which have been satisfactory in most respects. For example, U.S. Patent 2,963,616 by R. B. Nelson et al. describes a type of capacitive tuning arrangement for re-entrant resonant cavities which modifies the gap capacitance between opposed re-entrant drift tubes by means of a plunger type of tuning plate movable transverse to the drift tube or klystron longitudinal axis. A bellows is utilized to allow movement of the tuning plate while maintaining vacuum integrity. This tuner then must have an actuating mechanism sufficient to displace atmospheric pressures relative to internal vacuums approximately equal to or less than $10^{-5}$ Torr. This requires large torques and therefore, large work or energy requirements for the drive unit which necessarily results in increased cost per unit tube. Furthermore, the tuning arrangement depicted in the Nelson et al. patent results in perturbation of cavity volume dimensions and thus causes variation in cavity inductance as well as capacitance. This, of course, complicates the empirical design of such an arrangement and further adds to tuning non-linearity with regard to tuner position vs. frequency characteristics. Another prior art type of tuning structure which obviates some of the problems of the Nelson et al. arrangement is found in French Patent 55,646, which is the third patent of addition to French Patent 958,882. The French patent shows a capacitive tuning member supported within a cavity resonator of an electron discharge device for tuning said device in a predominately capacitive way by axial rocking motion along the tube or cavity axis of a semi-cylindrical shaped plate member mounted on a rocker arm. This type of motion is not particularly attractive since it produces asymmetrical electronic coupling to the capacitive member in the interaction gap and thereby excites undesired modes of oscillation in the tuner support structure. These undesired modes of oscillation can produce overheating of the tuning structure and produce dips in the power output of the tube over the tunable frequency band. An improved version of capacitive tuner for resonant cavities having re-entrant drift tubes is taught in U.S. patent application Serial No. 24,098, filed April 22, 1960 by Walter E. Nelson et al., now U.S. Patent No. 3,209,200, issued September 28, 1965. The tuner in W. E. Nelson et al. eliminates the electronic asymmetric coupling between gaps and tuner support rod heating problems due to excitation of undesired modes by employing a rocker arm supported tuning plate which approaches the gap in a plane transverse to the gap or tube axis. This concept of capacitive gap tuning by tuning plate motion transverse to the gap axis in a to-and-fro arcuate type or pendulum type of motion as disclosed and claimed in the aforementioned U.S. Patent No. 3,209,200 leads then to the present invention which is more or less a culmination in capacitive gap tuning techniques for resonant cavities to date, as described and claimed hereinafter.

In U.H.F. TV applications, communication systems and troposcatter systems, for example, it is desirable for the microwave power source to be tunable and broadbanded and capable of producing medium to high powers at good efficiencies. The multi-cavity klystron amplifier is one of the most suitable devices for meeting such requirements and the present invention represents a novel type thereof, which incorporates several novel features resulting in per unit cost savings as well as ease of operation. The aforementioned tuning arrangements of the prior art and their respective inherent deficiencies as pointed out previously, initiated the tuning features of the present invention, and these features, when taken alone or in conjunction with the cavity construction features of the present invention, result in what is thought to be a sound klystron design offering enhanced tuning characteristics and enhanced physical characteristics.

The utilization of hydroforming or liquid pressure shaping and forming constructional techniques offers the tube designer a relatively inexpensive fabrication approach for klystron cavity construction provided a cavity design is available which can benefit from the advantageous aspects of hydroforming fabrication techniques. The present invention through the utilization of a novel four-piece cavity design provides ease of assembly and low per unit cost advantages. The present invention, through the utilization of a capacitive tuner plate supported on a tuner shaft extending through the vacuum envelope of the cavity provides inexpensive and simplified tuner capability which is accurate, efficient and capable of wide tuning ranges as well as facilitating gang tuning of a plurality of coupled resonant cavities in a multi-cavity klystron.

It is, therefore, an object of the present invention to provide an improved high frequency electron discharge device.

A feature of the present invention is the provision of an improved four part resonant cavity design which facilitates punched part construction.

Another feature of the present invention is the provision of a resonant cavity having an improved pendulum tuning means.

Another feature of the present invention is the incorporation of said aforementioned features in a high frequency electron discharge device such as, for example, a klystron.

Figure 3:
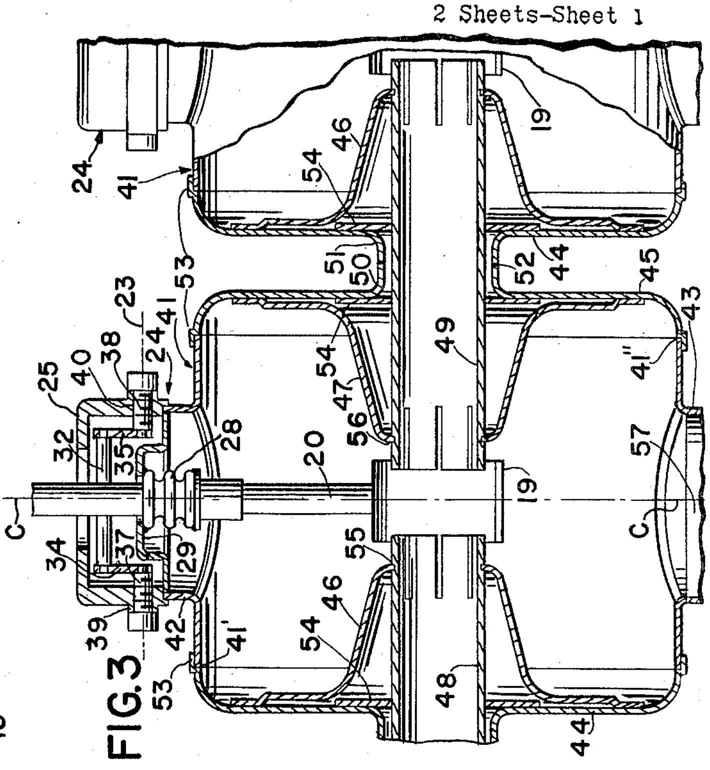
Figure 2:
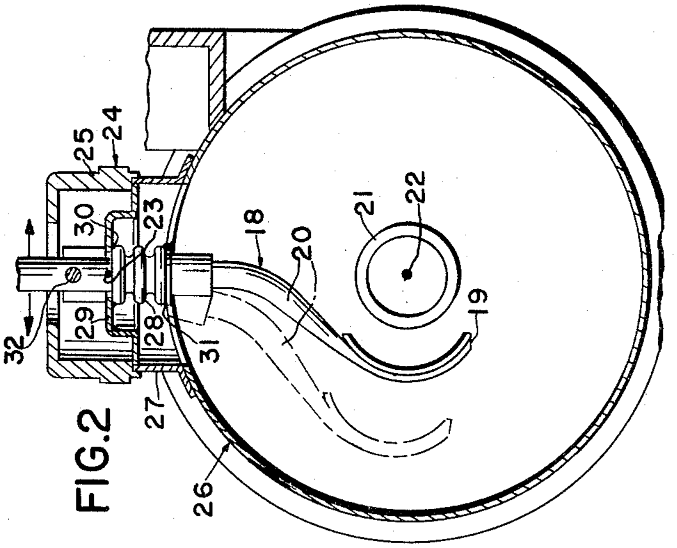

These and other features and advantages of the present invention will become more apparent upon a perusal of the following specification taken in conjunction with the accompanying drawings wherein:

FIG. 1 is a longitudinal elevational view partly cut-away depicting a klystron embodiment of the present invention, FIG. 2 is an enlarged sectional view partly in elevation of a resonant cavity portion of the klystron of FIG. 1 taken along the lines 2—2 in the direction of the arrows, FIG. 3 is a fragmentary sectional view partly in elevation of an alternative novel resonant cavity design incorporating the novel tuning aspects depicted in FIG. 2.

Figure 4:
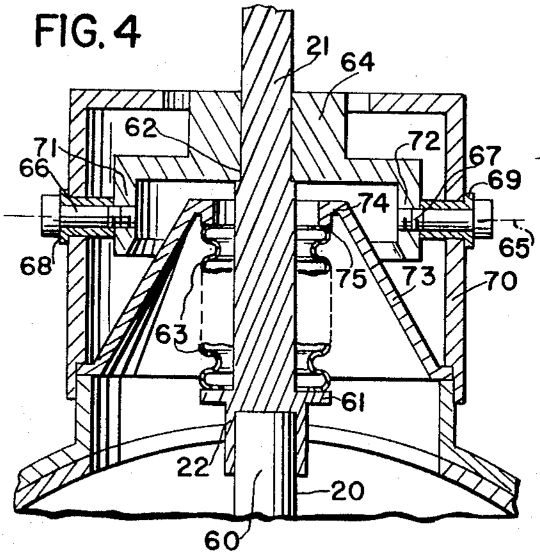
Figure 5:
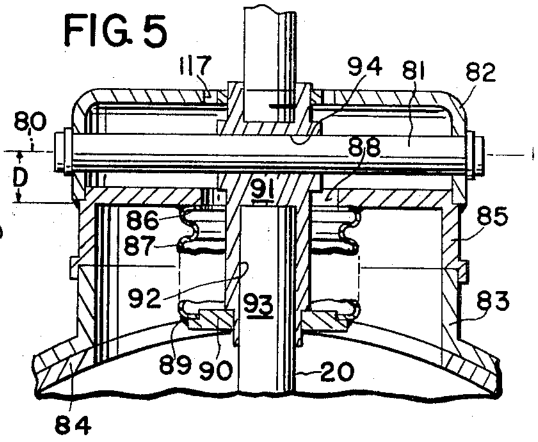
Figure 6:
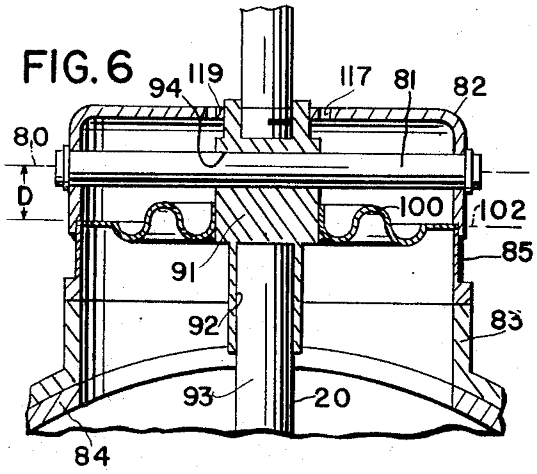
Figure 7:
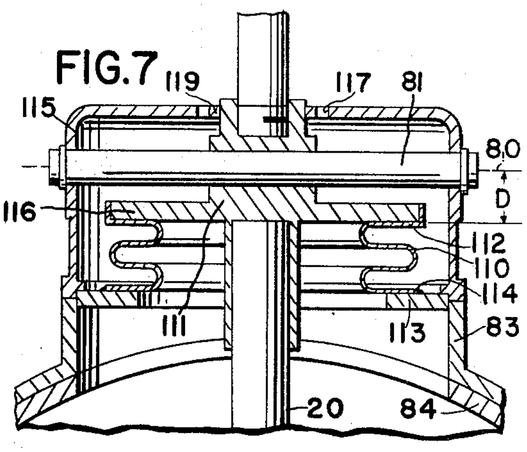
Figure 8:
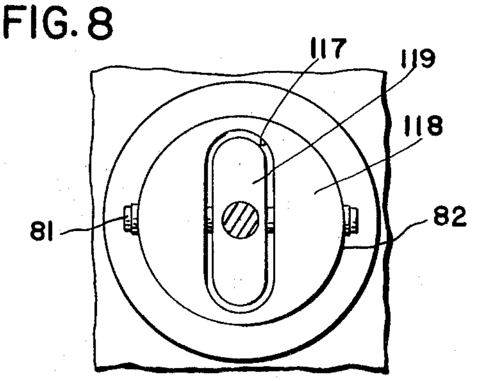

FIG. 4 is a sectional view partly in elevation of an alternative pendulum tuning embodiment, FIG. 5 is a sectional view partly in elevation of another alternative pendulum tuning embodiment, FIG. 6 is a sectional view partly in elevation of still another alternative pendulum tuning embodiment, FIG. 7 is a sectional view partly in elevation of one more alternative pendulum tuning embodiment, and FIG. 8 is a plan view of the embodiments depicted in FIGS. 5–7.

Referring now to FIG. 1, there is depicted a multi-cavity klystron device 9 having a beam forming and projecting means (electron gun means) 10 disposed at the upstream end thereof and electron beam collector means 11 disposed at the downstream end thereof, with a plurality of resonant cavities 12, 13, 14, 15 (electromagnetic interaction means) disposed intermediate said gun and collector means in vacuum sealed relationship therewith. The input cavity 12 is provided with suitable electromagnetic energy coupler means 16, preferably coaxial as shown, and the output cavity 15 is provided with electromagnetic energy coupler means 17 preferably as shown and described in co-pending U.S. patent application Serial No. 387,454, filed August 4, 1964, by Robert L. Woods and Ulrich Wolff, which is assigned to the same assignee as the present invention. Quite obviously, the particular electromagnetic energy couplers, beam forming and projecting means, interaction means, as well as other portions of the klystron depicted in FIG. 1, may take any of the acceptable prior art constructions of which the literature is replete.

Each of the resonant cavities is provided with a capacitive pendulum tuner 18 which is driven by a tuner actuating mechanism 18' which is preferably of the type shown and described in co-pending U.S. patent application Serial No. 392,210 by Jack A. Brown, filed August 26, 1964, and assigned to the same assignee as the present invention. Other equivalent actuating mechanisms which are capable of providing a pendulum motion to a tuner such as 18 are, of course, included within the scope of the present invention.

As best seen in FIGS. 2 and 3, the capacitive pendulum tuners 18 include a capacitive tuning plate 19 which is affixed to and supported by a pendulum tuner shaft 20 which extends through the cavity walls and externally of the vacuum envelope. The tuner plate 19 is preferably shaped to conform to the exterior geometry of the drift tubes 21 and is preferably disposed symmetrically about a plane which is normal to the tube's (device or klystron) longitudinal axis 22 and equally spaced between the opposed re-entrant drict tubes in each cavity. Each capacitive pendulum tuner shaft portion 20 which extends through the vacuum envelope, as shown, is adapted and arranged for oscillatory motion about a pivotal axis 23 in motion akin to a pendulum to cover the extremes of the tuning range for each cavity. The symmetrical disposition of the tuner pendulum shaft 20 within the cavity and motion of the pendulum shaft 20 in a plane transverse or normal to the cavity axis 22 obviates the perturbation and spurious mode excitation problems inherent in such capacitive tuners which utilize tuner shaft and plate having pendulum motion in an axial direction of the cavity as described in the aforementioned French Patent No. 55,646 and in combined capacitive-inductive tuner utilizing axial motion which is shown and described in U.S. Patent No. 2,945,156 by C. A. Arnold et al.

The present pendulum tuner provides a greatly simplified tuning technique which is capable of extremely easy control of tuning range and rate and location on an individual basis and which can be readily supplied with a tuner actuating mechanism which can have greatly reduced torque requirements due to elimination of prior art design defects which required displacement of cavity volume during tuning. In order to permit oscillation of the pendulum shaft 20 about the pivotal axis 23 while maintaining vacuum integrity, such as required in klystrons, a flexible diaphragm or bellows means are more than likely required such as, for example, as shown and described in the aforementioned U.S. Patent No. 2,963,616. Prior art purely capacitive tuners, such as shown in U.S. Patent No. 2,963,616 produced displacement of a volume of the tube's vacuum and when this displacement is combined with deformation and stretching of the bellows, problems of bellows life are incurred, in addition to the energy requirements needed to displace a given volume of space under differential vacuums in the vicinity of and less than $10^{-5}$ Torr. The present invention obviates all of these prior art difficulties while providing all of the low torque tuning advantages and other advantageous features set forth in the aforementioned co-pending U.S. patent application Serial No. 392,210 by Jack A. Brown.

As best seen in FIGS. 2 and 3, alternative cavity structures are shown employing the pendulum tuner support structure 24 which includes an annular cup shaped housing member 25 fixedly secured to the alternative resonant cavity shells 26, 41 at the peripheral edge of the annular flange portion 27 or 42, by any suitable metal joining techniques such as, for example, by brazing. Vacuum integrity is maintained within the cavity shells 26 or 41 by means of a flexible bellows 28 which is vacuum sealed, as by brazing, at the one end 30 to the apertured surface edge of off-set mounting ring 29 which is vacuum sealed, as by brazing, at its outer peripheral edge to the cavity shell flanges 27 or 42 as shown. The other end 31 of the bellows 28 is vacuum sealed as by brazing to the tuner pendulum shaft 20 to complete the flexible vacuum seal portion of the turner support structure 24. Pendulum tuner shaft 20 has a rocker support arm 32 fixedly secured to the shaft and transversely arranged with respect to the shaft axis. A pair of support cams 34 and 35 are fixedly secured to the rocker arm 32 at opposite ends thereof and serve to provide eccentric support of the rocker arm about the pivot axis 23 upon actuation of the tuner pendulum shaft 20 in the direction of the arrows as shown in FIG. 2. A pair of shafts 37, 38 are axially aligned with the pivot axis 23 rotatably secured within bearing portions 39, 40 in housing 25 in any conventional manner and provide rotatable support means for the eccentric motion of rocker arm 32 about pivot axis 23 as produced by cams 34 and 35.

The eccentric location of the rocker arm with respect to the pivot axis 23 permits location of the pivot axis such that it passes through a region axially coextensive with the bellows 28. This results in minimal deformation of the bellows over the entire tuning range and thus increased bellows life. It is to be noted that the volume of vacuum displaced by the bellows is susbtantially constant over the entire tuning range and thus the energy requirements of a tuner actuating mechanism coupled to the shaft are greatly reduced in comparison to prior art arrangements which involve changes in volume of the tube under differential pressure conditions.

In FIG. 3 an alternative preferred resonant cavity and klystron main body construction is illustrated in conjunction with the aforementioned tuner structure. The resonant cavity design depicted in FIG. 3 utilizes a basic four-part assembly which includes the following items:

(1) A preferably hydroformed cavity shell 41 having preferably diametrically disposed outwardly directed annular flanges 42, 43, said shell 41 having a pair of open ends defined by a pair of annular edges 41', 41'' which lie in a pair of spaced parallel planes, the flanges 42, 43 having a common central axis C—C which lies in a plane which is parallel to the pair of spaced parallel planes within which the annular edges 41', 41'' lie;

(2) A preferably hydroformed pair of identical cavity end cups 44, 45;

(3) A preferably hydroformed pair of identical cone shaped drift tube support cups 46, 47 and (4) A pair of drift tubes 48, 49.

Monel is preferred for items 1–3 and molybdenum for the drift tubes, the end portions of which are preferably serrated for multifactor suppression. Conventional brazed joints are preferably employed to provide vacuum integrity and structural rigidity. Adjacent cavities are joined by a preferably peripheral brazed or the like joint between adjoining flanged portions 50, 51 of cavity end cups 44, 45 as shown at 52. Punch press techniques may also advantageously be employed to form the parts 1–3 in lieu of hydroforming. The end cups 44, 45 of each cavity are provided with annular enlarged off-set portions 53 which are used to provide a snug press type engagement between the end cups and cavity shell peripheral edges whereupon brazing operations may be easily performed to provide vacuum integrity. Assembly of each cavity section is easily accomplished by simply brazing the end cups 44, 45 to their respective cone shaped drift tube support cups 46, 47 in which drift tubes 48, 49 are mounted and fixedly secured thereto as by brazed joints 55, 56 respectively. Then, the end cups are press fitted on the cavity shell and the tuner mechanism inserted to complete the assembly. A suitable plug 57 is vacuum sealed within annular flanged portion 43 for purposes of maintaining cavity symmetry. Plug 57 is also useful as a final trimming mechanism to preset each cavity resonant frequency. A support washer or ring member 54 preferably of Monel may advantageously be brazed to the internal walls of end cups 44, 45 to add rigidity and strength to the tube as well as functioning as an additional support for drift tubes 48, 49. Each ring or washer member 54 has a central aperture therein which fits snugly about the drift tubes. The ring or washer members, if used, will result in an additional part and, of course, increase cavity costs slightly.

In FIGS. 4–7, several alternative tuner support structures are depicted. In FIG. 4 pendulum tuner shaft 20 includes an elongated extension 21 having a coaxial bored out female coupler portion 22 which couples the two shaft portions 20, 21 together. A flange 61 and necked down portion 62 of shaft extension 21 provide respectively a support and vacuum sealing surface for bellows 63 and mounting surface for rocker arm 64. The pivot axis 65 has a pair of support shafts 66, 67 coaxially disposed therealong and rotatably supported in bearings 68, 69 which are mounted in the tuner support housing 70. A pair of cams 71, 72 interconnect the rocker arm 64 and support shafts 66, 67 for eccentric support of the shaft 20 about pivotal axis 65, which axis preferably intersects the bellows 63 along the longitudinal extent thereof, to again provide the aforementioned minimal stress of the bellows as described previously in connection with the embodiments depicted in FIGS. 2 and 3. A cone shaped cup support element 73 having an annular central aperture at the cone apex 74 serves to support the other end 75 of the bellows which is vacuum sealed thereto to thus provide a completed flexible vacuum seal for the pendulum tuner shaft 20. The advantages of the cone shaped cup 73 are, ease of manufacture, reduced cavity losses because current is spread over larger area at points of highest density to name a few.

In FIG. 5, tuner pendulum shaft 20 is mounted for pendulum oscillation about pivotal axis 80 in conjunction with rotatable support shaft 81 which is disposed in cuplike housing 82 in any conventional bearings not shown. Annular flanged portion 83 of cavity shell 84 serves as a mounting means and part of a housing for the tuner support structure. A cup shaped support member 85 disposed intermediate the cuplike housing 82 and annular flange portion 83 provides a support for the one end 86 of bellows 87 which is vacuum sealed thereto at the interior peripheral surface of central aperture 88 as shown. The other end 89 of the bellows 87 is secured in vacuum sealed relationship to the flange portion 90 of tuner shaft 20 to complete the flexible vacuum seal. A suitable coupler 91 having a coaxial bore 92 serves as a receptacle for the segment 93 of shaft 20 and a transverse bore 94 serves to couple the rotatable support shaft 81 to said shaft 20. Once again, all of the previously discussed advantages mentioned in connection with FIGS. 2, 3 and 4 are inherent in the embodiment depicted in FIG. 5. Furthermore, the elimination of the eccentric bearing support axis utilized in the previous embodiments simplifies construction of the tuner support structure although presenting a compromise with regard to minimizing bellows stress by having the pivot axis extend through the elongated axial extent of the bellows. However, the relatively minute spacing D between the one end 86 of the bellows and the pivot axis 80 results in very little increased bellows stress over the entire tuning range.

FIG. 6 represents a simplification of the embodiment of FIG. 5 wherein a flexible diaphragm 100 serves as a flexible vacuum seal between the shaft 20 and the cavity shell extension. Thus, the flexible diaphragm replaces the bellows, and accompanying support plates utilized in the prior embodiments. Since the remaining portions of the embodiment of FIG. 6 are similar to the embodiment described in FIG. 5, as evidenced by the reference numerals, further discussion thereof will not be made. Again, distance D in the FIG. 6 embodiment is minimal with regard to displacement of pivot axis 80 from the plane of the diaphragm 102 thereby minimizing diaphragm stress over the entire tuning range. Quite obviously, the aforementioned eccentric support arrangements depicted in FIGS. 2, 3 and 4 could be incorporated in the diaphragm embodiment of FIG. 6 in order to locate the pivot axis 80 within the plane 102 of the diaphragm.

FIG. 7 depicts another embodiment wherein a flexible bellows 110 is vacuum sealed to shaft 20 through coupler portion 111 at the one end 112 and to cavity shell 84 and accompanying flange portion 83 through intermediary support flange ring 113 at the other bellows end 114. A cup shaped support housing 115 provides conventional bearing support for rotatable support shaft 81 which is coupled to the coupler portion 111 of tuner shaft 20. Again, the displacement D between pivot axis 80 and the one end 112 of bellows 110 is kept at a minimum in order to minimize bellows stress during tuning. An enlarged annular flange 116 extends from the coupler portion 111 of shaft 20 to provide means for utilizing an enlarged diameter bellows which, of course, is subjected to less per unit stress for a given deflection of shaft 20 than smaller diameter bellows such as shown in FIG. 5, for example.

Common to each of the embodiments depicted in FIGS. 5–7, as best seen in FIG. 8, is an elongated slot 117 in the top portion 118 of housings 82 (115, FIG. 7) which permits freedom of movement for elongated plate 119 which preferably lies in the same plane as the top portion 118.

Quite obviously the shaft 20 and the various portions thereof including the coupler and extension portion could be made as an integral cast or machined part.

Since many changes could be made in the above construction and many apparently widely different embodiments of this invention could be made without departing from the scope thereof, it is intended that all matters contained in the above description or shown in the accompanying drawings shall be interpreted as illustrative and not in a limiting sense.

What is claimed is:

1. A high frequency electron discharge device including a beam forming and projecting means disposed at the upstream end portion of said device, an electron beam collector means disposed at the downstream end portion of said device, an electromagnetic interaction means including at least one resonant cavity disposed intermediate said beam forming and projecting means and said electron beam collector means along the longitudinal axis of said device, said aforementioned means serving to define a vacuum envelope for said device, said resonant cavity having a pair of spaced re-entrant drift tubes defining an interaction gap along the longitudinal axis of said device within said cavity, said resonant cavity having a capacitive tuner disposed therein, said capacitive tuner including a tuner member and a pendulum tuner shaft, said pendulum tuner shaft extending through said vacuum envelope of said device, whereby motion of said tuner may be induced by a tuner actuating mechanism external to said vacuum envelope, said tuner pendulum shaft being mounted for pendulum motion in a plane normal to the longitudinal axis of said device and about a pivotal axis such that the resonant frequency of said cavity resonator may be varied in accordance with the spacing between said tuner member and said gap, said device including flexible sealing means coupled between said pendulum tuner shaft and said resonant cavity, said flexible vacuum sealing means being a bellows coaxially disposed about and extending along a portion of the longitudinal extent of said pendulum tuner shaft, one end portion of said bellows being vacuum sealed to said pendulum tuner shaft and the other end portion of said bellows being vacuum sealed to said cavity, a cone shaped cup coaxially disposed about said pendulum tuner shaft and mounted on said cavity with said other end portion of said bellows being vacuum sealed to the apex portion of said cone shaped cup to complete said vacuum seal between said pendulum tuner shaft and said cavity.

2. A high frequency electron discharge device including a beam forming and projecting means disposed at the upstream end portion of said device, an electron beam collector means disposed at the downstream end portion of said device and electromagnetic interaction means including at least one resonant cavity disposed intermediate said beam forming and projecting means and said electron beam collector means along the longitudinal axis of said device, said aforementioned means serving to define a vacuum envelope for said device, said resonant cavity having a pair of spaced re-entrant drift tubes defining an interaction gap along the longitudinal axis of said device within said cavity, said resonant cavity having a capacitive tuner disposed therein, said capacitive tuner including a tuner member and a pendulum tuner shaft, said pendulum tuner shaft extending through said vacuum envelope of said device, whereby motion of said tuner may be induced by a tuner actuating mechanism external to said vacuum envelope, said tuner pendulum shaft being mounted for pendulum motion in a plane normal to the longitudinal axis of said device and about a pivotal axis such that the resonant frequency of said cavity resonator may be varied in accordance with the spacing between said tuner member and said gap, said cavity resonator including a metal cavity shell having open ends coaxially disposed about said longitudinal axis of said device, a pair of metal end cups sealed to said open ends of said metal cavity shell, a pair of metal cone shaped drift tube support cups coaxially disposed about the longitudinal axis of said device and re-entrantly disposed in spaced relation within said cavity resonator, each of said metal cone shaped drift tube support cups having a pair of flanges at the respective ends of said cone, the flanges at the apex end portion of the cone being inwardly directed and the flange at the enlarged end portion of the cone being outwardly directed, said flanges lying in planes transverse to the longitudinal axis of said device, and a pair of metal drift tubes supported within said support cups to thereby define said interaction gap of said cavity resonator.

3. A high frequency electron discharge device including beam forming and projecting means disposed at the upstream end portion of said device, electron beam collector means disposed at the downstream end portion of said device and electromagnetic interaction means including at least one resonant cavity disposed intermediate said beam forming and projecting means and said electron beam collector means along the longitudinal axis of said device, said aforementioned means serving to define a vacuum envelope for said device, said resonant cavity having a pair of spaced re-entrant drift tubes defining an interaction gap along the longitudinal axis of said device within said cavity, said resonant cavity having a capacitive tuner disposed therein, said capacitive tuner including a tuner member and a pendulum tuner shaft, said pendulum turner shaft extending through said vacuum envelope of said device whereby motion of said tuner may be induced by a tuner actuating mechanism external to said vacuum envelope, said tuner pendulum shaft being mounted for pendulum motion in a plane normal to the longitudinal axis of said device and about a pivotal axis such that the resonant frequency of said cavity resonator may be varied in accordance with the spacing between said tuner member and said gap, said device including flexible vacuum sealing means coupled between said pendulum tuner shaft and said resonant cavity, said pendulum tuner shaft being supported externally of the vacuum envelope of said device and undergoing pendulum motion in said plane normal to the longitudinal axis of the device both internally and externally of the vacuum envelope and said flexible vacuum sealing means, said pendulum tuner shaft being supported by rotatable support shaft means, said rotatable support shaft means being rotatably mounted on said device externally of the vacuum envelope and said flexible vacuum sealing means, said pivotable axis being spaced from and in parallel alignment with respect to the longitudinal axis of said device, said flexible means being a bellows coaxially disposed about and extending along a portion of the longitudinal extent of said pendulum tuner shaft, one end portion of said bellows being vacuum sealed to said pendulum tuner shaft and the other end portion of said bellows being vacuum sealed to said cavity.

4. The device as defined in claim 3 wherein the said one end portion of said bellows is vacuum sealed to said pendulum tuner shaft to an enlarged flange coaxially mounted on said tuner shaft.

5. A resonant cavity having an interaction gap therein defined by a pair of re-entrant drift tubes which define a cavity axis along which said drift tubes extend, a capacitive tuner disposed within said cavity, said capacitive tuner including a tuner plate and a tuner shaft, said tuner shaft extending through an aperture in the defining walls of said cavity whereby motion of said tuner may be induced by a tuner actuating mechanism external to said cavity defining walls, said tuner shaft being mounted for pendulum motion about a pivotal axis in a plane normal to the said cavity axis such that the resonant frequency of said cavity resonator may be varied in accordance with the spacing between said tuner plate and said gap, said resonant cavity including flexible vacuum sealing means coupled between said tuner shaft and said resonant cavity and vacuum sealed to said tuner shaft and said resonant cavity, said tuner shaft being supported externally of the defining walls of said resonant cavity and undergoing pendulum motion in a plane normal to said cavity axis both internally and externally of the defining walls of said resonant cavity and said flexible vacuum sealing means, said tuner shaft being supported by rotatable support shaft means, said rotatable support shaft means being rotatably mounted on said resonant cavity externally thereof and externally of said flexible vacuum sealing means, said pivotal axis being spaced from and in parallel alignment with respect to said cavity axis, said flexible means being a bellows coaxially disposed about and extending along a portion of the longitudinal extent of said tuner shaft, one end portion of said bellows being vacuum sealed to said shaft and the other end portion of said bellows being vacuum sealed to said cavity.

6. A high frequency electron discharge device including a beam forming and projecting means disposed at the upstream end portion of said device, an electron beam collector means disposed at the downstream end portion of said device and electromagnetic interaction means including at least one resonant cavity disposed intermediate said beam forming and projecting means and said electron beam collector means along the longitudinal axis of said device, said aforementioned means serving to define a vacuum envelope for said device, said resonant cavity having a pair of spaced re-entrant drift tubes defining an interaction gap along the longitudinal axis of said device within said cavity, said resonant cavity having a capacitive tuner disposed therein, said capacitive tuner including a tuner member and a pendulum tuner shaft, said pendulum tuner shaft extending through said vacuum envelope of said device whereby motion of said tuner may be induced by a tuner actuating mechanism external to said vacuum envelope, said pendulum tuner shaft being mounted for pendulum motion in a plane normal to the longitudinal axis of said device and about a pivotal axis such that the resonant frequency of said cavity resonator may be varied in accordance with the spacing between said tuner member and said gap, said device including flexible vacuum sealing means coupled between said pendulum tuner shaft and said resonant cavity, said pendulum tuner shaft being supported externally of the vacuum envelope of said device and undergoing pendulum motion in said plane normal to the longitudinal axis of the device both internally and externally of the vacuum envelope and said flexible vacuum sealing means, said pendulum tuner shaft being supported by rotatable support shaft means, said rotatable support shaft means being rotatably mounted on said device externally of the vacuum envelope and said flexible vacuum sealing means, said pivotable axis being spaced from and in parallel alignment with respect to the longitudinal axis of said device, said rotatable support shaft means including a rocker arm which is eccentrically disposed with respect to said pivotable axis, said rocker arm being disposed normal to the plane of motion of said pendulum tuner shaft.

7. A high frequency electron discharge device including a beam forming and projecting means disposed at the upstream end portion of said device, an electron beam collector means disposed at the downstream end portion of said device and electromagnetic interaction means including at least one resonant cavity disposed intermediate said beam forming and projecting means and said electron beam collector means along the longitudinal axis of said device, said aforementioned means serving to define a vacuum envelope for said device, said resonant cavity having a pair of spaced re-entrant drift tubes defining an interaction gap along the longitudinal axis of said device within said cavity, said resonant cavity having a capacitive tuner disposed therein, said capacitive tuner including a tuner member and a pendulum tuner shaft, said pendulum tuner shaft extending through said vacuum envelope of said device whereby motion of said tuner may be induced by a tuner actuating mechanism external to said vacuum envelope, said pendulum tuner shaft being mounted for pendulum motion in a plane normal to the longitudinal axis of said device and about a pivotal axis such that the resonant frequency of said cavity resonator may be varied in accordance with the spacing between said tuner member and said gap, said device including flexible vacuum sealing means coupled between said pendulum tuner shaft and said resonant cavity, said pendulum tuner shaft being supported externally of the vacuum envelope of said device and undergoing pendulum motion in said plane normal to the longitudinal axis of the device both internally and externally of the vacuum envelope and said flexible vacuum sealing means, said pendulum tuner shaft being supported by rotatable support shaft means, said rotatable support shaft means being rotatably mounted on said device externally of the vacuum envelope and said flexible vacuum sealing means, said pivotable axis being spaced from and in parallel alignment with respect to the longitudinal axis of said device, said rotatable support shaft means being a shaft lying along said pivotable axis and coaxial with respect thereto.

8. A resonant cavity having an interaction gap therein defined by a pair of re-entrant drift tubes which define a cavity axis along which said drift tubes extend, a capacitive tuner disposed within said cavity, said capacitive tuner including a tuner plate and a tuner shaft, said tuner shaft extending through an aperture in the defining walls of said cavity whereby motion of said tuner may be induced by a tuner actuating mechanism external to said cavity defining walls, said tuner shaft being mounted for pendulum motion about a pivotal axis in a plane normal to the said cavity axis such that the resonant frequency of said cavity resonator may be varied in accordance with the spacing between said tuner plate and said gap, said resonant cavity including flexible vacuum sealing means coupled between said tuner shaft and said resonant cavity and vacuum sealed to said tuner shaft and said resonant cavity, said tuner shaft being supported externally of the defining walls of said resonant cavity and undergoing pendulum motion in a plane normal to said cavity axis both internally and externally of the defining walls of said resonant cavity and said flexible vacuum sealing means, said tuner shaft being supported by rotatable support shaft means, said rotatable support shaft means being rotatably mounted on said resonant cavity externally thereof and externally of said flexible vacuum sealing means, said pivotal axis being spaced from and in parallel alignment with respect to said cavity axis, said rotatable support shaft means including a rocker arm which is eccentrically disposed with respect to said pivotal axis, said rocker arm being disposed normal to the plane of motion of said tuner shaft.

9. A resonant cavity having an interaction gap therein defined by a pair of re-entrant drift tubes which define a cavity axis along which said drift tubes extend, a capacitive tuner disposed within said cavity, said capacitive tuner including a tuner plate and a tuner shaft, said tuner shaft extending through an aperture in the defining walls of said cavity whereby motion of said tuner may be induced by a tuner actuating mechanism external to said cavity defining walls, said tuner shaft being mounted for pendulum motion about a pivotal axis in a plane normal to the said cavity axis such that the resonant frequency of said cavity resonator may be varied in accordance with the spacing between said tuner plate and said gap, said resonant cavity including flexible vacuum sealing means coupled between said tuner shaft and said resonant cavity and vacuum sealed to said tuner shaft and said resonant cavity, said tuner shaft being supported externally of the defining walls of said resonant cavity and undergoing pendulum motion in a plane normal to said cavity axis both internally and externally of the defining walls of said resonant cavity and said flexible vacuum sealing means, said tuner shaft being supported by rotatable support shaft means, said rotatable support shaft means being rotatably mounted on said resonant cavity externally thereof and externally of said flexible vacuum sealing means, said pivotal axis being spaced from and in parallel alignment with respect to said cavity axis, said rotatable support shaft means being a shaft lying along said pivotal axis.

10. A resonant cavity having an interaction gap therein defined by a pair of re-entrant drift tubes which define a cavity axis along which said drift tubes extend, a capacitive tuner disposed within said cavity, said capacitive tuner including a tuner plate and a tuner shaft, said tuner shaft extending through an aperture in the defining walls of said cavity whereby motion of said tuner may be induced by a tuner actuating mechanism external to said cavity defining walls, said tuner shaft being mounted for pendulum motion about a pivotal axis in a plane normal to the said cavity axis such that the resonant frequency of said cavity resonator may be varied in accordance with the spacing between said tuner plate and said gap, said resonant cavity including flexible vacuum sealing means coupled between said tuner shaft and said resonant cavity and vacuum sealed to said tuner shaft and said resonant cavity, said tuner shaft being supported externally of the defining walls of said resonant cavity and undergoing pendulum motion in a plane normal to said cavity axis both internally and externally of the defining walls of said resonant cavity and said flexible vacuum sealing means, said tuner shaft being supported by rotatable support shaft means, said rotatable support shaft means being rotatably mounted on said resonant cavity externally thereof and externally of said flexible vacuum sealing means, said pivotal axis being spaced from and in parallel alignment with respect to said cavity axis, said cavity including a cavity shell coaxially disposed about said cavity axis and defining a pair of open ends, a pair of metal end cups sealed to said open ends of said cavity shell, a pair of metal cone shaped drift tube support cups coaxially disposed about the cavity axis of said resonant cavity and re-entrantly disposed in a spaced relationship within said cavity resonator and a pair of metal drift tubes supported within said support cups to thereby define an interaction gap, each of said metal cone shaped drift tube support cups having a pair of flanges at the respective ends of said cone, the flange at the apex end portion of the cone being inwardly directed and the flange at the enlarged end of the cone being outwardly directed, said flanges lying in planes transverse to the cavity axis.

References Cited by the Examiner

UNITED STATES PATENTS

| | | | |
|---|---|---|---|
| 2,929,955 | 3/1960 | James | 315—5.46 |
| 3,227,916 | 1/1966 | Proskauer | 315—5.53 X |
| 3,227,917 | 1/1966 | Nishida | 315—5.53 X |

HERMAN KARL SAALBACH, *Primary Examiner.*

ELI LIEBERMAN, P. L. GENSLER, *Assistant Examiners.*